US008483380B2

(12) United States Patent
Lederer

(10) Patent No.: US 8,483,380 B2
(45) Date of Patent: Jul. 9, 2013

(54) PROVIDING COMMUNICATION TO A SUBSCRIBER HAVING A PLURALITY OF TERMINALS

(75) Inventor: Thomas Lederer, Herrsching (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 238 days.

(21) Appl. No.: 13/055,257

(22) PCT Filed: Jul. 29, 2009

(86) PCT No.: PCT/EP2009/005503
§ 371 (c)(1),
(2), (4) Date: Jan. 21, 2011

(87) PCT Pub. No.: WO2010/015353
PCT Pub. Date: Feb. 11, 2010

(65) Prior Publication Data
US 2011/0129080 A1 Jun. 2, 2011

(30) Foreign Application Priority Data
Aug. 4, 2008 (DE) .................. 10 2008 036 257

(51) Int. Cl.
*H04M 3/42* (2006.01)
(52) U.S. Cl.
USPC ................... 379/209.01; 379/101.01
(58) Field of Classification Search
USPC ........................ 379/209.01, 101.01
See application file for complete search history.

(56) References Cited

U.S. PATENT DOCUMENTS

2001/0049745 A1  12/2001  Schoeffler
2008/0069332 A1  3/2008  Ekstrom

FOREIGN PATENT DOCUMENTS

EP  1892938 A2  7/2007

OTHER PUBLICATIONS

Written Opinion of the International Searching Authority for PCT/EP2009/005503 (Form PCT/ISA/237) (English Translation), Jan. 21, 2011.
International Preliminary Report on Patentability for PCT/EP2009/005503 (Forms PCT/IB/373, PCT/ISA/237) (German Translation), Jan. 21, 2011.
International Preliminary Report on Patentability for PCT/EP2009/005503 (Forms PCT/IB/373, PCT/ISA/237) (English Translation), Jan. 21, 2011.
International Search Report for PCT/EP2009/005503 dated Oct. 30, 2009 (Forms PCT/ISA/220, PCT/ISA/210) (German Translation), Jan. 21, 2011.
International Search Report for PCT/EP2009/005503 dated Oct. 30, 2009 (FormPCT/ISA/210) (English Translation), Jan. 21, 2011.
Written Opinion of the International Searching Authority for PCT/EP2009/005503 (Form PCT/ISA/237), Jan. 21, 2011.

*Primary Examiner* — Quynh Nguyen
(74) *Attorney, Agent, or Firm* — Buchanan Ingersoll & Rooney PC

(57) ABSTRACT

The invention relates to a method for providing communication, comprising a plurality of communication subscribers, comprising at least one first piece of address information associated with a first communication subscriber, a second and at least one third piece of address information associated with at least a second communication subscriber and a fourth piece of address information associated with a central control function, wherein in the event of a failure of a first connection attempt made to a second communication subscriber by a communication subscriber determined by the first piece of address information while using the second piece of address information, during a second attempt at a connection following the failure by the first communication subscriber determined by the first piece of address information to the central control function determined by the fourth piece of address information, the control function initiates the forwarding of the second connection to the second communication subscriber while using the third piece of address information. The invention further relates to a communication system for carrying out the method.

18 Claims, 1 Drawing Sheet

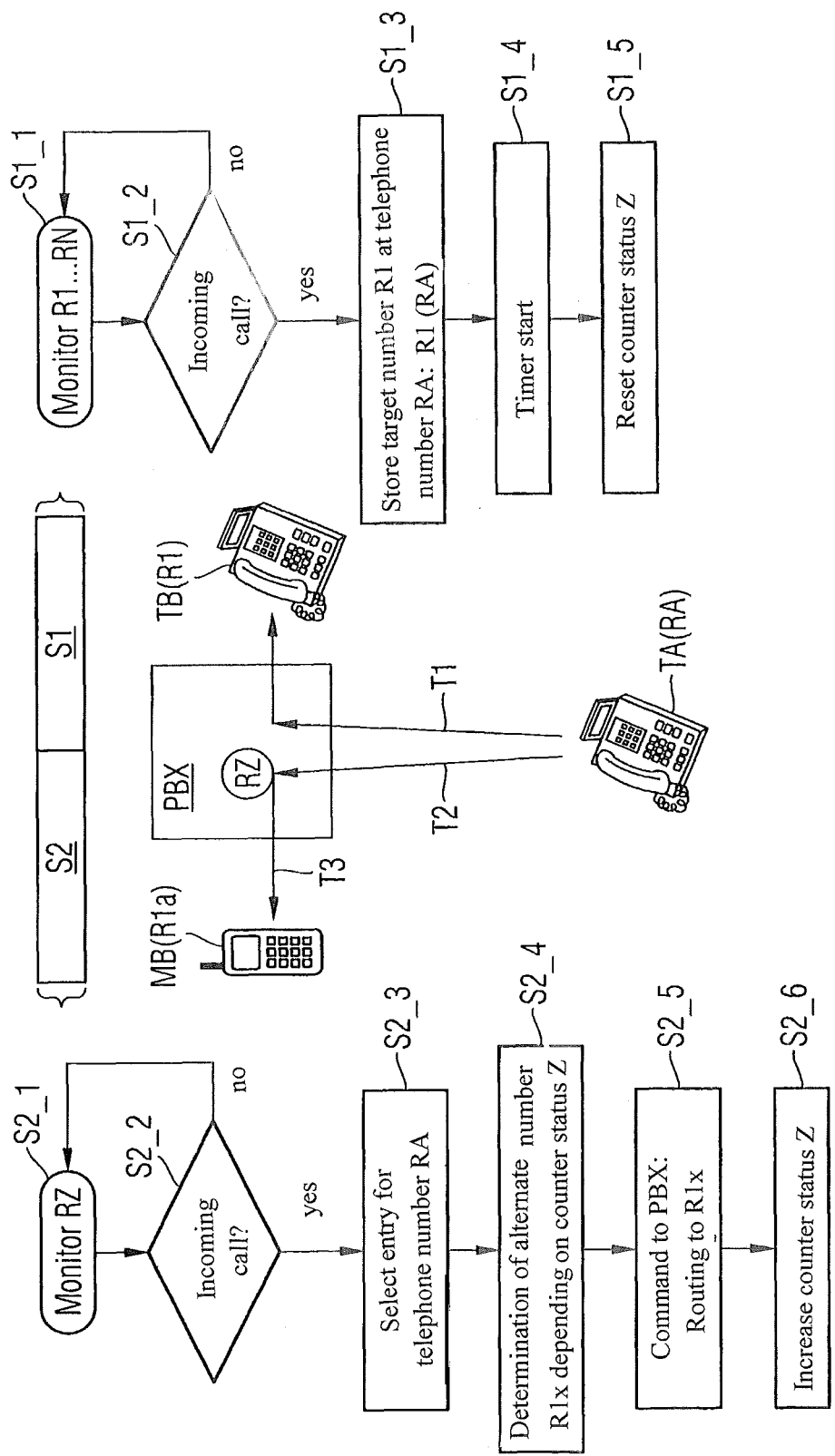

PROVIDING COMMUNICATION TO A SUBSCRIBER HAVING A PLURALITY OF TERMINALS

CROSS-REFERENCE TO RELATED APPLICATIONS

This application is the United States national phase under 35 U.S.C. §371 of PCT International Patent Application No. PCT/EP2009/005503, filed on Jul. 29, 2009, and claiming priority to German application no. 10 2008 036 257.3, filed on Aug. 4, 2008. Those applications are incorporated by reference herein.

BACKGROUND OF THE INVENTION

1. Field of the Invention

Embodiments of the invention relate to methods and devices for providing notification to intended communications subscribers.

2. Background of the Related Art

A known problem with communication systems is not being able to reach subscribers. There are many possible solutions for this, such as call forwarding, answering machines, voicemail, or automatic notification by e-mail or wireless mobile text messaging. However, these solutions have the disadvantage that it often occurs that important messages do not reach the intended subscriber promptly or at all.

BRIEF SUMMARY OF THE INVENTION

In an embodiment of the invented method for providing communication, with multiple communication subscribers, with at least one first piece of address information assigned to a first communication subscriber, a second and at least a third piece of address information assigned to at least a second communication subscriber, and a fourth piece of address information assigned to a central control function, if a communication subscriber determined by the first piece of address information initiates a first attempt to connect to a second communication subscriber, using the second piece of address information, and that attempt fails, during a second attempt made after the failure by the first communication subscriber determined by the first piece of address information to connect to the central control function determined by the fourth piece of address information, the control function initiates the forwarding of the second connection to the second communication subscriber using the third piece of address information.

An easily implemented method for this is offered here, which increases the likelihood of reaching a communication partner to whom multiple communication terminals are assigned with respect to the telephone numbers or similar address information assigned to him, such as VoIP accounts, e-mail addresses, and similar connection to voice-based (telephone/fax) communication terminals. For urgent contact attempts, a technical solution is offered here that requires simply the knowledge of a (primary) number for the desired communication subscriber, as well as a central telephone number.

Preferably, when the first connection attempt fails, a first piece of information is stored and organized in such a way that the first piece of address information is assigned to the second piece of address information. This makes it easy to determine who attempted to make which subscriber connection. This organized storage is particularly advantageous if the caller is not part of a subscriber field defined by private transmission equipment, because otherwise this information would not be readily available.

Furthermore, the at least one third piece of address information is preferably stored assigned to the second communication subscriber, in particular by the central control function. This makes it possible to manage alternative contact options from a central point, making optimum use of the invented method.

As an alternative or addition, in an advantageous extension of the invention, the at least one third piece of address information can be taken from an address list. This allows additional flexibility and user-friendliness, making it possible to tell when members of the subscriber field no longer need to enter their alternative contact options again.

A further advantageous extension of the invented method allows the following:
 when the first connection attempt fails, a timer starts counting down a preset time period,
 when the timer runs down, the first information is deleted.
This is a simple way to correlate a contact request with the degree of urgency.

It is also advantageous to extend the method such that:
 when an additional first connection attempt is made before the timer runs down, the counter is incremented,
 the system checks to see if another third piece of address information exists,
 if there is another third piece of address information, another second connection attempt is made using the additional third piece of address information.

With this addition, when there are more than two pieces of address information (private and/or work-related cell phone numbers, private landline number) assigned to the desired subscriber, it is possible to make connection attempts using each of them in succession.

If the call is ended because there are no more available, this guarantees that the resources are freed up again as quickly as possible. A defined status indicating this negative case can be implemented.

As an alternative or an extension, it is advantageous to further expand the invention such that, if there are no more pieces of address information available,
 the timer starts over,
 the counter is reset,
 the first piece of address information becomes the first third piece of address information, so that the at least one third piece of address information becomes the at least one additional third piece of address information.

In this way, the successive connection attempts with changing address information start over again, beginning with the primary number as the forwarding target, so the caller can continue to use the service according to the invention for as long as it takes to successfully forward the call or until he terminates the calling attempts.

BRIEF DESCRIPTION OF THE FIGURES

The FIGURE shows a schematic representation of a scenario according to the communication system and a flow chart for one variation of the invented method.

DETAILED DESCRIPTION OF THE INVENTION

In a preferred extension of the method according to an embodiment of the invention, the central control function includes a branch device, such that each second piece of address information for the at least second communication subscriber is generated based on an address space subordinated by the branch device's control. This is advantageous when the invented method is installed in private networks.

If, before the call is ended, a piece of information for the caller is transmitted to the caller's terminal and announced visually and audibly at the terminal, this offers the user more agreeable and efficient use of the service provided according to the invention and, if applicable, prevents additional calls with the corresponding resource waste.

The communication system according to the invention, which activates a performance indicator at a first communication terminal, is distinguished by a means of realizing the method as in one of the aforementioned versions and thus contributes to implementing the aforementioned advantages of each further extension of the method.

The FIGURE shows a schematic representation of a communication system for real-time voice communication with a telephone switching unit PBX shown as a square and, connected through a subscriber connection SL to the telephone switching unit PBX, a first telephone TA with the telephone number RA as the first communication terminal used by a first user. In the exemplary embodiment shown, a second telephone T1 with telephone number R1 is connected to the telephone switching unit PBX.

The communication system represents, for example, a private communication network in which, in addition to the telephones TA, T1 shown, multiple telephones TA, T1 ... TN can be connected to the telephone switching unit PBX.

Correspondingly, at least one telephone number RA, R1 ... RN is assigned to each of these multiple telephones TA, T1 ... TN.

In addition, it is assumed that the telephone switching unit PBX is connected through a public utility line and/or through a chain of connection controllers to a mobile telephone MB on a mobile wireless network or to a third telephone TB (not shown) on a public communication network, which a second user uses as an alternative to the second telephone T1 that is assigned to him in the private network.

A base station (not shown) can be connected through a voice connection line, which is not shown as part of the exemplary embodiment and therefore not described in detail here, to a public switching point. Transmitting text and multimedia messages from mobile wireless devices is further simplified by connecting the base station to a data network through a data connection line.

The public utility line and the mobile wireless connection MV are distinguished in the aforementioned exemplary embodiment in that they can transmit telephone number information for a sending subscriber via CLIP.

The telephone switching unit PBX is part of a connection controller VS according to the invention, shown as a shaded square, which in turn can include an SMS Gateway SMSGW, a CTI application (CTI: Computer Telephony Integration), a Directory Service LDAP, or a telephone switching unit database for the telephone switching unit PBX. Here the SMS Gateway has a connection through the aforementioned data network and the aforementioned data connection line DV to the base station, as well as a connection through an additional data connection line to the CTI application. This is further connected through a CTI interface to the telephone switching unit PBX and through an additional data connection line to the Directory Service.

The first telephone TA as the first communication terminal according to the invention is connected through the subscriber connection line SL to and controlled by the telephone switching unit PBX. As described above, the first telephone number RA is assigned to the first telephone TA, while a second telephone number R1 is assigned to the second telephone T1 and a third telephone number R1$a$ is assigned to the mobile telephone MB. In addition, according to the invention, a central telephone number RZ is assigned to the telephone switching unit.

The arrangement described here is fundamental to the invented method, which should be explained in more detail using an example of a sequence. This begins at a first point in time t1 with a call going out from the first telephone TA and directed to the second telephone T1. Because, according to the scenario in the example, the subscriber to whom the call is directed is absent, the call is unanswered or is answered with an invitation to leave a message in the subscriber's voice-mailbox.

This result of the call is normally satisfactory, but for particularly urgent calls requiring immediate or very prompt contact with the targeted subscriber, it is an inadequate solution.

The invention offers a solution in which, after the unsuccessful call placed at the first point in time t1 to the second telephone T1, the caller can reach the subscriber by placing a call at a second point in time t2 after the first point in time t1 to the central telephone number RZ, which, according to the invention, recognizes that someone is trying to reach the subscriber to whom the second telephone T1 is assigned and forwards the call at an immediately following third point in time t3 to one of the alternative telephone numbers stored in the system.

In the preceding example, the third telephone number R1$a$ is for the mobile unit MB of the subscriber who was not reached initially. According to the invention, however, it could also be the telephone number of the fourth telephone TB (not shown), which, for example, is not connected to the telephone switching unit PBX but instead can be a telephone that is reachable through the public network. This can be the private connection of the subscriber who was not reached at work through the telephone switching unit PBX.

To guarantee this functionality, according to the exemplary embodiment of the invention, a first process S1, specifically breaker-controlled and running in the background parallel to the processes required for routine communication, is implemented, and a second breaker-controlled process S2, also running in parallel in the background, is also implemented.

The first process S1 and the second process S2, while they are active in the background during an outgoing transmission, perform a monitoring function in the receipt of calls to one or more telephone numbers provided to them, which are available or assigned to the telephone switching unit.

The first process S1 thereby observes, in a first step S1_1 according to the exemplary embodiment, all of the telephone numbers RA, R1 . . . RN assigned to the telephones TA, T1 . . . TN connected to the telephone switching unit. Alternatively, the telephones, or rather their telephone numbers, dialed in the telephone switching unit PBX for the function according to the invention.

In a second step S1_2, as part of the (observation) monitoring, the system tests, in closed-loop form, to see whether a call for the monitored telephone numbers is received.

If so, in a third step S1_3, the target telephone number is stored; according to this scenario, the target telephone number is the second telephone number R1, assigned to the telephone number RA of the caller or of the first telephone TA, determined using CLIP.

Further, in the second step S1_2 or alternatively not until the third step S1_3, or even immediately upon connection in a fourth step S1_4, a timer is started. The timer's time can be a predefined fixed value or can be entered or preset. In general, if there is a predefined time value, it is determined, for example, by simulations or retrospectively to find an optimal execution or performance of the invented method. In addition, according to the invention example, a timer is provided for each of the (dialed) telephone numbers RA, R1 . . . RN, because when the timer runs out, the unsuccessful stored call attempts to the respective telephone number RA, R1 . . . RN are deleted, so separate monitoring of the individual telephone numbers RA, R1 . . . RN is guaranteed.

If the first subscriber now calls the central telephone number RZ within the time window, i.e. the second point in time t2 occurs before the timer has run out, then as part of the second process S2 the first telephone number RA is captured and tested to see whether for this telephone number, during the first process S1, there is a piece of information stored assigning it to a telephone number R1 . . . RN associated with an unsuccessful attempt. That is, in the scenario shown, whether the second telephone number R1 is called by a terminal with the first telephone number RA and therefore a piece of assignment information R1 (RA) is stored.

If this is the case, the second process S2 tests to see whether an alternate telephone number has been provided for the first telephone number R1. According to the scenario shown, this is provided by the mobile number R1a assigned to the mobile device MB, so that, according to the exemplary embodiment of the invention, the call from the first terminal TA that reached the central telephone number RZ is forwarded to the alternate number R1a at the third point in time t3.

The invention makes it possible, without knowing the alternate telephone number, simply by calling a number designated in the system as such a number, to reach the desired subscriber at his second or third terminal.

So that the second process can also determine the target automatically, without having to direct questions back to the caller, it is a feature of the exemplary embodiment that only the last of the dialed but not reached telephone numbers RA, R1 . . . RN for each source is stored. This means that, if a fourth telephone T2 (not shown) announced to the telephone switching unit was called from the first telephone TA after the first point in time t1, the assignment would be deleted regardless of the expiration of the timer set for the first telephone number R1 during the first process, and instead an assignment RA (R2) for the telephone number of the fourth telephone T2 would be stored. This ensures that there is a clear assignment of caller source to important target.

Alternatively, this can also be guaranteed if, in addition to the assignment, an additional quantity indicating the assignment is stored, such as the number of outgoing unsuccessful connection attempts directed from the first telephone TA to the second telephone T1 and the fourth telephone T2, and the system depends on the (larger) number for determining the target as part of the second process S2.

As an additional extension or alternative, statistical values, especially referring to call logs, such as frequency of calls from the first terminal TA to the second terminal T2 or times of calls to certain telephone numbers, are possible and can be used advantageously depending upon available resources.

In a fifth step S1_5, when the timer starts, in addition a counter, which is responsible for recording connection attempts made according to the invention to one of the telephone numbers R1 . . . RN from the same source within a time window established by the timer value, is reset, wherein this absolutely must not mean a reset to the "zero" value, but rather, referring to the first connection attempt related to this reset, can also be set to the value of "one."

The first process S1 performs the organized storage in such a way that, for each calling number RA, only the last telephone number R1 . . . RN that it called is stored, and this assignment is deleted after the timer started in the fourth step S1_4 runs out.

The second process S2 is responsible for monitoring the central telephone number RZ, wherein, as previously explained, this process runs in parallel with the first process S1 and cooperates with it according to the invented method.

This occurs beginning with an initial status in the sixth step S2_1, by means of which in a seventh step S2_2 there is closed-loop testing to determine whether a call to the central telephone number RZ has been received, and if this can be answered affirmatively, in an eighth step S2_3 a possible caller number RA assumed in the scenario is selected using the input stored in the first process S1.

If there is no input available, because no subscriber monitored in the first process S1 was called from the first telephone TA or the timer set in the first process has run out and therefore an already existing input has been deleted, then the call is simply ended. As an alternative or extension, the caller can be informed of this by means of a message.

If, however, there is an input, then in a ninth step S2_4 a command is generated in the telephone switching unit PBX to forward the incoming call in a tenth step S2_5 to an alternate number, which is provided by a stored assignment R1 (RA), because it has remembered the last unreached telephone number, and the third telephone number R1a assigned to that telephone number can be determined using that remembered unreached telephone number.

According to an exemplary embodiment of the invention that is not shown, the invented process can also be ended once this forwarding occurs. An advantageous and also illustrated further extension consists of having the assigned number also queried, depending on the current counter status, in the ninth step S2_4, so that in the case where the second call to the central telephone number RZ has already gone out from the first telephone TA within a short time according to the timer, a possible second alternate number assigned by the user of the second telephone T1 is set as the forwarding target, wherein the counter is increased by as many alternate numbers as have been assigned as locations where the user of the second telephone T1 can be reached.

If no additional number is furnished, the call is simply ended by the central telephone number RZ, with a prior message if necessary.

As an alternative, it is conceivable that the first alternate number can be used again for forwarding, i.e., the alternate number is determined using modulo division.

The invented method therefore guarantees that an urgently sought communication subscriber can be reached more easily and without knowing all of his telephone numbers. It is necessary to know only one of his numbers and the central telephone number RZ.

While the invention was explained using the exemplary embodiment with voice devices, it can also be used with communication terminals such as video or multimedia terminals or data terminals such as faxes. In addition, the telephone terminals can also involve software telephone applications on a workplace computer or a PDA. Additionally, the communication method can be circuit-switched or packet-oriented, and the telephones can be circuit-switched or packet-oriented, wired or mobile terminals.

The first telephone TA making the call can generally be connected to a public or private communication network, a mobile wireless network, an ISDN network, a public or private data network, or a wireless data network, as long as a connection to the second telephone T1 from the first telephone TA is possible.

Telephone numbers obviously can also include a VoIP account, in the form of an e-mail address, for example, or other information that identifies a User Agent.

The invention claimed is:

1. A method for communication between multiple communication subscribers, wherein at least one first piece of information is assigned to a first communication subscriber, wherein a second piece of information and a third piece of information are assigned to a second communication subscriber, and wherein a fourth piece of information is assigned to a central control function, comprising:

the first communication subscriber attempting a first call to the second communication subscriber, the attempted first call being addressed based upon the second piece of information, the attempted first call resulting in the first communication subscriber not connecting with the second communication subscriber;

upon a determination that the first attempted call did not result in the first communication subscriber connecting with the second communication subscriber, the first piece of information being linked to the second piece of information;

the first communication subscriber initiating a second call to the central control function via the fourth piece of information within a first predetermined amount of time after the attempted first call, the fourth piece of information identifying an address at which the central control function is reachable by the first communication subscriber;

the central control function automatically determining that the first communication subscriber is calling the central control function to be connected to the second communication subscriber based upon the first piece of information being linked to the second piece of information and the first communication subscriber calling the central control function within the first predetermined amount of time after the attempted first call; and the central control function determining that the third piece of information is associated with the second communication subscriber and attempting to connect the first communication subscriber with the second communication subscriber in a third call via the third piece of information, the third piece of information identifying an address at which the second communication subscriber is reachable, the address identified by the third piece of information being different than an address identified by the second piece of information.

2. The method of claim 1 comprising:
monitoring incoming calls directed to the second communication subscriber at the address identified by the second piece of information such that information identifying an address of a calling party that initiated a detected incoming call directed to the second communication subscriber at the address identified by the second piece of information is linked with the second piece of information, the first piece of information being linked with the second piece of information based upon the monitoring of the incoming calls.

3. The method of claim 1, comprising storing, by the central control function, the third piece of information assigned to the second communication subscriber.

4. The method of claim 1, comprising obtaining the third piece of information from an address list.

5. The method of claim 1, comprising:
deleting the linking of the first piece of information to the second piece of information upon a determination that the first predetermined amount of time has passed after the attempted first call.

6. The method of claim 1, comprising
monitoring incoming calls directed to the second communication subscriber at the address identified by the second piece of information such that information identifying an address of a calling party that initiated a detected incoming call directed to the second communication subscriber is linked with the second piece of information, the first piece of information being linked with the second piece of information based upon the monitoring of the incoming calls; and wherein the monitoring is breaker-controlled and runs in parallel to processes required for communications made in a private network to which the second communication subscriber is reachable via the address identified by the second piece of information.

7. The method of claim 6, wherein the central control function comprises a branch device or a telephone switching unit.

8. The method of claim 7, wherein the automatic determination that the first communication subscriber is calling the central control function to be connected to the second communication subscriber based upon the first piece of information being linked to the second piece of information and the first communication subscriber calling the central control function within the first predetermined amount of time after the attempted first call occurs without any questions being directed back to the first communication subscriber in response to the second call.

9. The method of claim 1, wherein the central control function includes a branch device, and comprising generating the second piece of information for the second communication subscriber based on an address space subordinated by the branch device.

10. The method of claim 1, comprising transmitting a piece of information for the first communication subscriber to a terminal of the first communication subscriber, the terminal of the first communication subscriber announcing the piece of information for the first communication subscriber visually or audibly at the terminal of the first communication subscriber, and ending the attempted first call.

11. A communication system comprising:
a telephone switching unit within a network, the network having a plurality of communication terminals connected to the telephone switching unit, the terminals comprising a first terminal associated with a first communication subscriber and a second terminal associated with a second communication subscriber, a first piece of address information associated with the first terminal and a second piece of address information associated with the second terminal;

the first terminal attempting a first call to the second terminal, the attempted first call being addressed based upon the second piece of address information, the attempted first call resulting in the first communication subscriber not connecting with the second communication subscriber;

upon a determination that the first attempted call did not result in the first communication subscriber connecting with the second communication subscriber, the first piece of address information being linked to the second piece of address information;

the first terminal initiating a second call to the telephone switching unit via a third piece of address information associated with the telephone switching unit, the second call being initiated within a first predetermined amount of time after the attempted first call, the third piece of address information identifying an address at which a central control function of the telephone switching unit is reachable by the first terminal;

the telephone switching unit automatically determining that the first terminal initiated the second call to be connected to the second communication subscriber based upon the first piece of address information being linked to the second piece of address information and the first terminal calling the telephone switching unit within the first predetermined amount of time after the attempted first call; and the telephone switching unit determining that a fourth piece of address information is associated with the second communication subscriber and attempting to connect the first terminal with the second communication subscriber in a third call via the fourth piece of address information, the fourth piece of address information identifying an address at which a third terminal is callable, the third terminal being associated with the second communication subscriber.

12. The system of claim 11 wherein the telephone switching unit monitoring incoming calls directed to the second terminal such that information identifying an address of a calling party that initiated a detected incoming call directed to the second terminal is linked with the second piece of address information, the first piece of address information being linked with the second piece of address information based upon the telephone switching unit monitoring of the incoming calls.

13. The system of claim 12 wherein the monitoring is breaker-controlled and runs in parallel to processes run by the telephone switching unit.

14. The system of claim 12 wherein the automatic determination that the first terminal is calling the telephone switching unit to be connected to the second communication subscriber based upon the first piece of address information being linked to the second piece of address information and the first terminal calling the telephone switching unit within the first predetermined amount of time after the attempted first call occurs without any questions being directed back to the first terminal in response to the second call.

15. The system of claim 12 wherein the third terminal is a mobile telephone having an address identified by the fourth piece of address information.

16. The system of claim 15 further comprising a base station that is communicatively connected to the mobile telephone.

17. The system of claim 12 wherein the third terminal is a telephone that is reachable via a public network.

18. The system of claim 12 wherein the first piece of address information is a telephone number of the first terminal, the second piece of address information is a telephone number of the second terminal, the fourth piece of address information is a telephone number of the third terminal, and the third piece of address information is a telephone number of the telephone switching unit.

* * * * *